(12) United States Patent
Song et al.

(10) Patent No.: US 11,428,994 B2
(45) Date of Patent: Aug. 30, 2022

(54) SUBSTRATE

(71) Applicant: LG Chem, Ltd., Seoul (KR)

(72) Inventors: Cheol Ock Song, Daejeon (KR); Ji Young Hwang, Daejeon (KR); Han Min Seo, Daejeon (KR); Sung Eun Park, Daejeon (KR); Nam Seok Bae, Daejeon (KR); Seung Heon Lee, Daejeon (KR); Jung Sun You, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/751,866

(22) Filed: Jan. 24, 2020

(65) Prior Publication Data
US 2020/0159058 A1   May 21, 2020

Related U.S. Application Data
(63) Continuation of application No. PCT/KR2018/008549, filed on Jul. 27, 2018.

(30) Foreign Application Priority Data

Jul. 27, 2017 (KR) .......... 10-2017-0095465
Jul. 26, 2018 (KR) .......... 10-2018-0087289

(51) Int. Cl.
*G02F 1/1339* (2006.01)
*G02F 1/1335* (2006.01)
*G02F 1/1343* (2006.01)

(52) U.S. Cl.
CPC ...... *G02F 1/13394* (2013.01); *G02F 1/13398* (2021.01); *G02F 1/133512* (2013.01); *G02F 1/134309* (2013.01)

(58) Field of Classification Search
CPC .......... G02F 1/13394; G02F 1/133512; G02F 1/134309; G02F 2001/13398
See application file for complete search history.

(56) References Cited

U.S. PATENT DOCUMENTS 6,097,467 A   8/2000   Fujimaki et al.
6,661,488 B1   12/2003   Takeda et al.
(Continued)

FOREIGN PATENT DOCUMENTS

CN       1656395 A    8/2005
CN     102231026 A   11/2011
(Continued)

OTHER PUBLICATIONS

Extended European Search Report including the Written Opinion for Application No. EP 18837543.0 dated Apr. 15, 2020, 9 pages.
(Continued)

*Primary Examiner* — Nathanael R Briggs
(74) *Attorney, Agent, or Firm* — Lerner, David, Littenberg, Krumholz & Mentlik, LLP

(57) ABSTRACT

A substrate having a spacer formed thereon, a method of making the same, and an optical device including the same are disclosed herein. In one embodiment, a substrate includes a base layer, and a black column spacer formed on the base layer, wherein the black column spacer has an optical density in a range of 1.1 to 4, and wherein the black column spacer having a curved portion, wherein a cross section of the curved portion having at least one region having curvature.

13 Claims, 10 Drawing Sheets

(56) References Cited

U.S. PATENT DOCUMENTS

| | | | |
|---|---|---|---|
| 7,785,501 B2 | 8/2010 | Segawa et al. | |
| 8,445,914 B2 | 5/2013 | Shim et al. | |
| 8,514,355 B2 | 8/2013 | Woo et al. | |
| 9,335,589 B2 | 5/2016 | Kwon et al. | |
| 9,698,174 B2 | 7/2017 | Kwak et al. | |
| 2003/0223216 A1 | 12/2003 | Emmons et al. | |
| 2005/0231669 A1 | 10/2005 | Kim | |
| 2008/0318018 A1 | 12/2008 | Segawa et al. | |
| 2012/0050653 A1* | 3/2012 | Nagata | G02F 1/13394 349/106 |
| 2015/0338695 A1* | 11/2015 | Xu | G06F 3/0412 349/12 |
| 2016/0017168 A1* | 1/2016 | Korchev | C09D 5/00 427/553 |
| 2017/0348943 A1* | 12/2017 | Kajiya | B29D 11/00788 |
| 2018/0314105 A1* | 11/2018 | Shu | G02F 1/136286 |
| 2018/0321535 A1* | 11/2018 | Kim | G03F 1/50 |
| 2019/0018318 A1 | 1/2019 | Jeong et al. | |

FOREIGN PATENT DOCUMENTS

| | | | |
|---|---|---|---|
| CN | 106873238 A | | 6/2017 |
| EP | 0022311 A1 | | 1/1981 |
| JP | 2001033790 A | | 2/2001 |
| JP | 2013050498 A | | 3/2013 |
| JP | 2016122163 A | | 7/2016 |
| KR | 20050004238 A | | 1/2005 |
| KR | 20060126338 A | | 12/2006 |
| KR | 20080010808 A | | 1/2008 |
| KR | 100967465 B1 | | 7/2010 |
| KR | 20110086937 A | | 8/2011 |
| KR | 20130062123 A | | 6/2013 |
| KR | 20140061786 A | * | 5/2014 |
| KR | 20140061786 A | | 5/2014 |
| KR | 20140091398 A | | 7/2014 |
| KR | 20150083564 A | | 7/2015 |
| KR | 20150083956 A | | 7/2015 |
| KR | 101658374 B1 | | 9/2016 |
| KR | 101688464 B1 | | 12/2016 |
| KR | 20170086399 A | | 7/2017 |
| TW | 509808 B | | 11/2002 |
| TW | 200702850 A | | 1/2007 |
| WO | 03102642 A2 | | 12/2003 |
| WO | 2017086590 A1 | | 5/2017 |

OTHER PUBLICATIONS

International Search Report for Application No. PCT/KR2018/008549 dated Dec. 17, 2018, 3 pages.

Search Report dated Mar. 9, 2022 from Office Action for Chinese Application No. 201880048881 dated Mar. 15, 2022. (see p. 1-2, categorizing the cited references).

* cited by examiner

SUBSTRATE

CROSS-REFERENCE TO RELATED APPLICATION(S)

The present application is a continuation of International Application No. PCT/KR2018/008549, filed on Jul. 27, 2018, which claims priority from Korean Patent Application No. 10-2017-0095465, filed on Jul. 27, 2017 and Korean Patent Application No. 10-2018-0087289, filed on Jul. 26, 2018, the disclosures of which are incorporated by reference herein.

TECHNICAL FIELD

The present application relates to a substrate.

BACKGROUND ART

An optical device capable of adjusting light transmittance or colors or reflectance by disposing a light modulating material such as a liquid crystal compound or a mixture of a liquid crystal compound and a dye between substrates disposed opposite to each other is known. For example, Patent Document 1 discloses a so-called GH cell (guest host cell) applying a mixture of a liquid crystal host and a dichroic dye guest.

In such a device, so-called spacers are located between the substrates to maintain the spacing between the substrates.

PRIOR ART DOCUMENTS

Patent Documents

Patent Document 1: European Patent Publication No. 0022311

DISCLOSURE

Technical Problem

Figure 1:
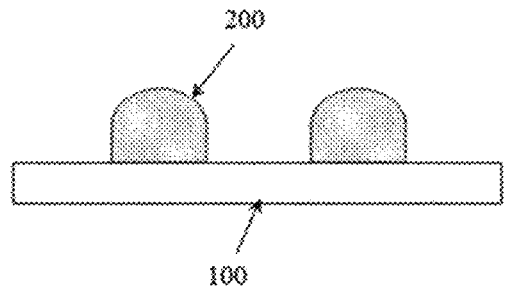
FIGS. 1, 2 and 18 are schematic diagrams of forms of substrates in accordance with the present disclosure.

The present application provides a substrate. It is one object of the present application to provide a substrate on which a black spacer having a high optical density is formed, wherein the spacer is attached to a base layer or an electrode layer on a base layer with excellent adhesion and does not cause defects such as light leakage when applied to a product. It is another object of the present application to provide a method for manufacturing a substrate to which such a spacer is applied.

Technical Solution

Among physical properties mentioned in this specification, when the measured temperature affects the results, the relevant physical properties are physical properties measured at room temperature, unless otherwise specified. The term room temperature is a natural temperature without being heated or cooled, which may be, for example, any temperature in a range of 10° C. to 30° C., or about 23° C. or about 25° C. or so. In addition, unless otherwise specified herein, the unit of temperature is ° C.

Among physical properties mentioned in this specification, when the measured pressure affects the results, the relevant physical properties are physical properties measured at room pressure, unless otherwise specified. The term normal pressure is a natural pressure without being pressurized or depressurized, where usually about 1 atm is referred to as the normal pressure.

The substrate of the present application comprises a base layer and a spacer present on the base layer.

As the base layer, for example, any base layer used in a substrate in a configuration of a known optical device such as an LCD (liquid crystal display) can be applied without particular limitation. For example, the base layer may be an inorganic base layer or an organic base layer. As the inorganic base layer, a glass base layer or the like can be exemplified, and as the organic base layer, various plastic films or the like can be exemplified. The plastic film can be exemplified by a TAC (triacetyl cellulose) film; a COP (cycloolefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenemaphthatate) film; a PET (polyethyleneterephtalate) film; a PI (polyimide) film; a PSF (polysulfone) film or a PAR (polyarylate) film, and the like, but is not limited thereto.

In the substrate of the present application, the thickness of the base layer is also not particularly limited, where an appropriate range may be selected depending on applications.

A spacer is present on the base layer. The spacer may be fixed to the base layer. In this case, the spacer may be fixed directly in contact with the base layer, or if there are other layers between the base layer and the spacer, it may be fixed on the relevant other layer. The kind of the other layer includes a known layer necessary for driving the optical device and for example, an electrode layer or the like, which is described below, can be exemplified.

For example, the substrate may have a structure in which an electrode layer is further present between the base layer and the column spacer, and the spacer is in contact with the electrode layer.

Figure 2:
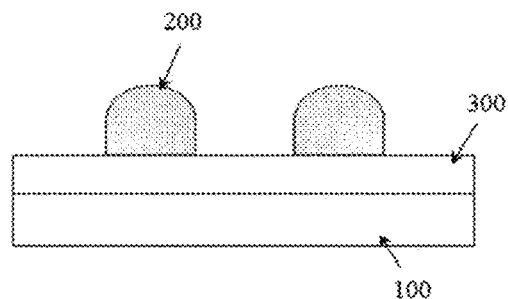

FIG. 1 is a diagram of a case where the spacer (200) is formed on the base layer (100) and FIG. 2 is a diagram of a case where the electrode layer (300) is formed on the base layer (100) and the spacer (200) is formed thereon.

In one example, the spacer may be a black column spacer. In the present application, the term black spacer may mean a spacer whose optical density is measured in a range of 1.1 to 4. The optical density can be obtained by measuring the transmittance (unit: %) of the black spacer or the transmittance (unit: %) of a layer comprising the same components as the black spacer and then substituting it into an equation of optical density (optical density=$-\log_{10}$ (T), where T is the transmittance). Here, the layer comprising the same components as the black spacer may be formed, for example, by a method such as coating, vapor deposition or plating. At this time, the thickness of the formed layer may be the same as the height of the black spacer, or about 12 μm or so. For example, in the category of the black spacer, a case where the optical density of the layer with a thickness of about 12 μm formed of the same components as the black spacer is in the above-mentioned range, the optical density of the actual black spacer is in the above range or the value obtained by converting the optical density of the layer with a thickness of about 12 μm in consideration of the thickness of the actual black spacer is in the above range may be included. Such an optical density can be obtained, for example, by a method for evaluating the optical density of the spacer in the following examples or comparative examples. In another example, such an optical density may be about 3.8 or less, about 3.6 or less, about 3.4 or less, about 3.2 or less, about 3 or less, about 2.8 or less, about 2.6 or less, about 2.4 or less, about 2.2 or less, about 2 or less, or may be 1.2 or more, 1.4 or more, or 1.6 or more.

In an optical device capable of adjusting light transmittance, colors and/or reflectance, the region where the spacer exists becomes an optically inactive region, and in the present application, through application of the above-mentioned optical density to the black spacer, occurrence of light leakage or the like upon driving the device can be prevented and uniform optical performance can be ensured.

Such a black spacer can be produced, for example, by adding a component capable of realizing black to a material for typically producing a column spacer.

For example, the spacer may comprise a pigment or a dye capable of darkening, and the like, and specifically, a metal oxide, a metal nitride, a metal oxynitride, carbon black, graphite, an azo-based pigment, a phthalocyanine pigment or a carbon-based material, and the like. As the metal oxide which can be applied in the above, chromium oxide ($Cr_xO_y$, etc.) or copper oxide ($Cu_xO_y$, etc.), and the like can be exemplified and as the metal oxynitride, aluminum oxynitride ($Al_xO_yN_z$, etc.) can be exemplified, without being limited thereto. In addition, as the carbon-based material, porous carbon such as carbon nanotube (CNT), graphene and activated carbon can be exemplified, without being limited thereto.

For example, the black spacer can be manufactured by combining the material (e.g., carbon-based material) together with the curable resin and then curing them, or applying the material itself to deposition or plating and the like in an appropriate manner.

However, the types of pigments, dyes and the like that can be used in the present application are not limited to the above, and appropriate types may be selected depending on the desired darkening (optical density) and the like, and the ratios in the spacer may also be selected in consideration of the darkening and the like.

In one example, the spacer may have a height in a range of 1 μm to 50 μm. In another example, the height may be 3 μm or more, 5 μm or more, 7 μm or more, 9 μm or more, 11 μm or more, 13 μm or more, 15 μm or more, 17 μm or more, 19 μm or more, 21 μm or more, 23 μm or more, 25 μm or more, or 27 μm or more. In another example, the height may be 48 μm or less, 46 μm or less, 44 μm or less, 42 μm or less, 40 μm or less, 38 μm or less, 36 μm or less, 34 μm or less, 32 μm or less, 30 μm or less, 28 μm or less, or 26 μm or less.

In the present application, the shape of the column spacer is not particularly limited, and for example, a cylindrical shape, a polygonal column shape such as a triangular, quadrangular, pentagonal or hexagonal column shape, a hemispherical shape, a mesh shape or other shapes can be all applied. The spacer includes a curved portion. In one example, the spacer may be a hemispherical spacer, where the curved portion is a hemispherical portion that is formed at least at the top end of the spacer. By applying the spacer having such a hemispherical portion, even when orientation treatment such as rubbing orientation or photo-orientation is performed after an alignment film is formed on the base layer on which the spacer is formed, the uniform orientation treatment can be performed even in the region where the spacer exists without influence of the step by the spacer.

In the present application, the term curved portion may mean a part of the spacer including a curved shape in which the trajectory of the cross section has a predetermined curvature. In addition, the trajectory of the cross section of the curved portion may include a curved part where the center of curvature is present inside the cross-sectional trajectory.

In one example, the curved portion may have a maximum curvature of the cross-sectional trajectory of 2,000 $mm^{-1}$ or less. As is known, the curvature is a numerical value representing a degree of curvature of a line, which is defined as an inverse number of a radius of curvature which is a radius of a contact circle at a predetermined point of the relevant curve. In the case of a straight line, the curvature is 0, and the larger the curvature, the more curved the curve exists.

By controlling the degree of bending of the curved portion so that the maximum curvature of the cross-sectional trajectory of the curved portion is 2,000 $mm^{-1}$ or less, the uniform orientation treatment can be performed even when the orientation treatment of the alignment film is performed at the top of the curved portion. Here, the cross section for confirming the cross-sectional trajectory of the curved portion may be any normal plane for the base layer. In addition, the maximum curvature may mean the largest curvature among the curvatures for all the contact circles that can be obtained on the cross-sectional trajectory of the hemispherical portion. In other words, the cross-sectional trajectory of the curved portion may not include the bent portion such an extent that the curvature exceeds 2,000 $mm^{-1}$.

In another example, the maximum curvature may be 1,800 $mm^{-1}$ or less, 1,600 $mm^{-1}$ or less, 1,400 $mm^{-1}$ or less, 1,200 mm$^{-1}$ or less, 1,000 mm$^{-1}$ or less, 900 mm$^{-1}$ or less, 950 mm$^{-1}$ or less, 800 mm$^{-1}$ or less, 750 mm$^{-1}$ or less, 700 mm$^{-1}$ or less, 650 mm$^{-1}$ or less, 600 mm$^{-1}$ or less, 550 mm$^{-1}$ or less, 500 mm$^{-1}$ or less, 450 mm$^{-1}$ or less, 400 mm$^{-1}$ or less, 350 mm$^{-1}$ or less, 300 mm$^{-1}$ or less, 250 mm$^{-1}$ or less, 200 mm$^{-1}$ or less, or 150 mm$^{-1}$ or less or so. In another example, the maximum curvature may be 5 mm$^{-1}$ or more, 10 mm$^{-1}$ or more, 15 mm$^{-1}$ or more, 20 mm$^{-1}$ or more, 25 mm$^{-1}$ or more, 30 mm$^{-1}$ or more, 40 mm$^{-1}$ or more, 45 mm$^{-1}$ or more, or 50 mm$^{-1}$ or more.

The cross-sectional trajectory of the curved portion may or may not include a portion having curvature of 0, that is, a linear portion.

Figure 3:
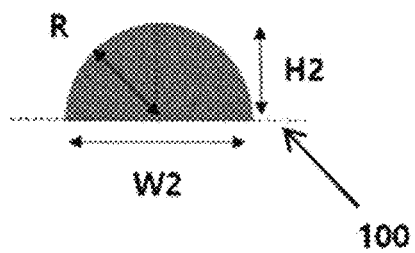
FIGS. 3 to 12 are schematic diagrams for explaining shapes of spacers in accordance with the present disclosure.
Figure 4:
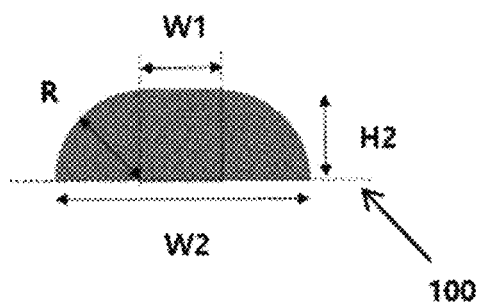

For example, FIG. 3 is an example of a cross-sectional trajectory of a curved portion that does not include a portion having curvature of 0, and FIG. 4 is an example of a cross-sectional trajectory of a curved portion including a portion having curvature of 0.

The spacer comprises the curved portion as above at least at the top end of the spacer.

The spacer may be formed in various shapes as long as it comprises the curved portion. For example, the spacer may be a shape in which the curved portion is directly formed on the surface of the base layer, as shown in FIG. 3 or 4, or may be a columnar spacer including the curved portion at the top end of the spacer, as shown in FIG. 5 or 6.

Figure 5:
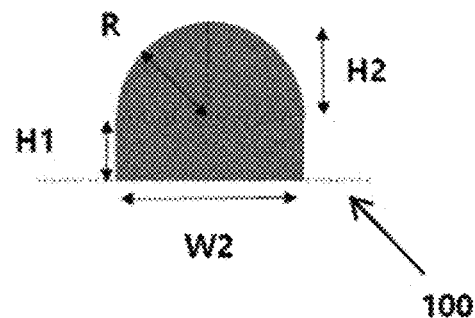
Figure 6:
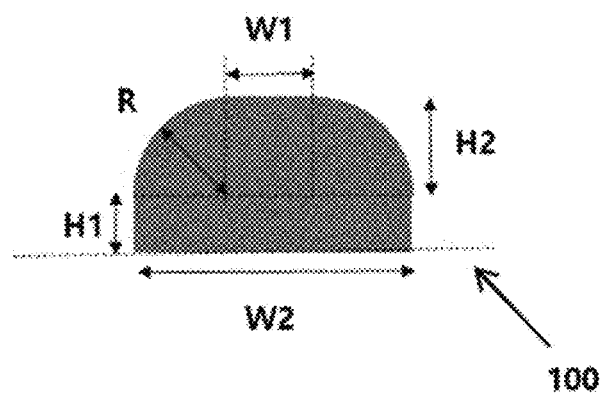

In the curved portion of the spacer, the cross-sectional trajectory may not include a portion having curvature of 0, as shown in FIG. 3 or 5, or the cross-sectional trajectory may also include a portion (a flat surface on the top) having curvature of 0, as shown in FIG. 4 or 6. Hereinafter, for convenience, the curved portion of the same shape as that of a hemispherical in FIG. 3 or 5 may be referred to as a hemispherical portion, and the curved portion having a shape in which a flat surface is formed at the top end of the spacer in FIG. 4 or 6 may be referred to as a curved portion including a flat portion.

In FIGS. 3 to 6, H2 is the height of the curved portion, R is the radius of curvature of the curved portion, W1 is the length (width) of the flat surface of the flat portion, W2 is the width of the spacer, H1 is the value obtained by subtracting the height (H2) of the curved portion from the total height of the spacer.

The curved portion may be a complete hemispherical shape or may be one having an approximately hemispherical shape. The complete hemispherical shape may be a hemispherical shape satisfying Relational Expression 1 to be described below, and the approximate hemispherical shape may be a hemispherical shape satisfying any one of Relational Expressions 2 to 4 below.

The curved portion may have a shape in which the cross-sectional shape satisfies any one of Relational Expressions 1 to 4 below.

$a=b=R$      [Relational Expression 1]

$a \neq b = R$ or $b \neq a = R$      [Relational Expression 2]

$a=b<R$      [Relational Expression 3]

$a \neq b < R$      [Relational Expression 4]

In Relational Expressions 1 to 4, a is the horizontal length of the curved portion section measured at the center of the virtual contact circle of the curved portion section, b is the vertical length of the curved portion section measured at the center of the virtual contact circle of the curved portion section, and R is the curvature radius of the virtual contact circle of the curved portion section.

The curvature radius in Relational Expressions 1 to 4 corresponds to the length indicated by R in FIGS. 3 to 6.

In Relational Expressions 1 to 4, the virtual contact circle may mean a contact circle having the largest curvature radius among a plurality of virtual contact circles in contact with the curved line forming the curved portion.

If the curved portion is the complete hemispherical shape as shown in FIGS. 3 and 5, the cross section of the curved portion as a whole is a curved line, and thus a contact circle having the largest curvature radius among a plurality of virtual contact circles in contact with any point of the relevant curved line may be a contact circle as referred to in Relational Expressions 1 to 4. In addition, if the curved portion includes a flat portion as shown in FIGS. 4 and 6, a contact circle having the largest curvature radius among a plurality of virtual contact circles in contact with any point of both side curved lines excluding the flat line on the top in the curved portion section becomes a virtual contact circle as referred to in Relational Expressions 1 to 4.

In Relational Expressions 1 to 4, the horizontal length is a length measured in a direction horizontal to the base layer surface (Reference Numeral 100 in FIGS. 3 to 6) at the center point of the virtual contact circle, and the vertical length is a length measured in a direction vertical to the base layer surface (Reference Numeral 100 in FIGS. 3 to 6).

In Relational Expressions 1 to 4, a is the length from the center of the virtual contact circle of the curved portion section to the point where the hemispherical portion is terminated as measured while proceeding in the horizontal direction. This horizontal length may have two lengths of a length from the center of the virtual contact circle as measured while proceeding in the rightward direction and a length measured while proceeding in the leftward direction, where a applied in Relational Expressions 1 to 4 means a short length of the two lengths. In the case of the curved portion having a shape of FIGS. 3 and 5, the horizontal length (a) is a value corresponding to ½ of the width (W2) of the spacer. Also, in the case of FIGS. 4 and 6, the value (2a+W1) obtained by adding the length (width) (W1) of the flat portion to twice the horizontal length (a) may correspond to the width (W2) of the spacer.

In Relational Expressions 1 to 4, b is the length from the center of the virtual contact circle of the curved portion section to the point where the hemispherical portion first meets while proceeding in the vertical direction. Usually, this vertical length (b) may be approximately the same as the height of the curved portion, for example, the length indicated by Symbol H2 in FIGS. 3 to 6.

Figure 7:
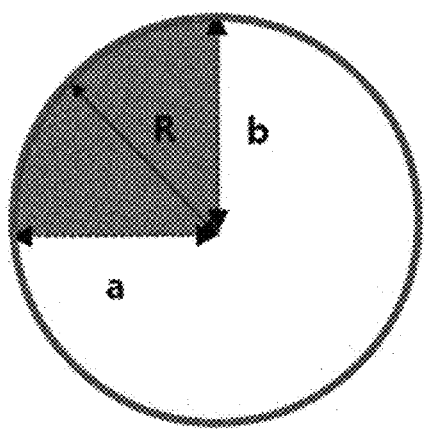
Figure 8:
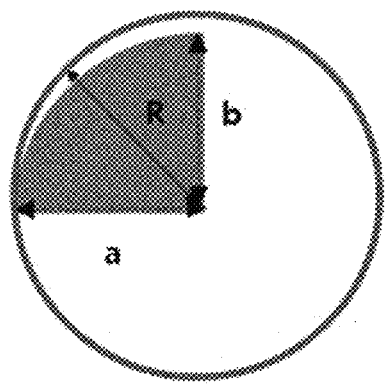
Figure 9:
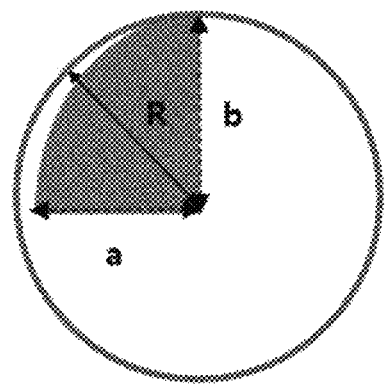
Figure 10:
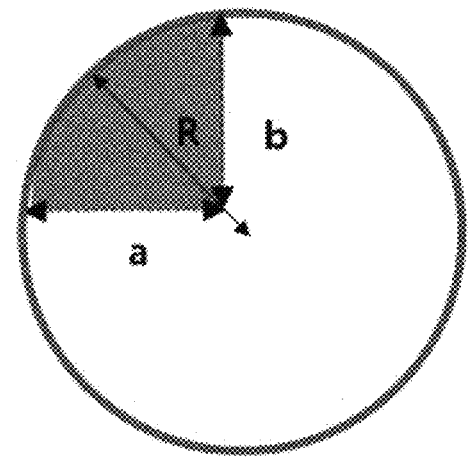
Figure 11:
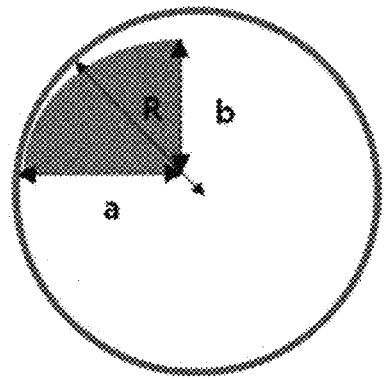
Figure 12:
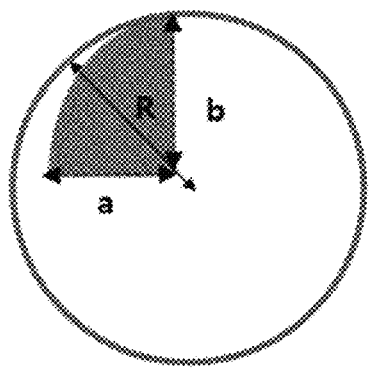

FIG. 7 is a cross-sectional curve shape of the curved portion satisfying Relational Expression 1 above, which shows a case where the curved line of the curved portion has a complete circle curve, that is, a curve coinciding with the virtual contact circle.

Also, FIGS. 8 to 12 show approximate curve shapes of the curved portion satisfying any one of Relational Expressions 2 to 4.

A tapered portion, in which the cross-sectional trajectory is a curved shape that the curvature center is formed outside the cross section, may be formed at the bottom end of the spacer, for example, the bottom end contacting the base layer side. With this form, an excellent effect according to the specific shape of the spacer of the present application, for example, achievement of the uniform orientation treatment or the like can be further improved.

The dimension of the spacer having the same shape as above is not particularly limited, which can be appropriately selected in consideration of, for example, a cell gap of the desired optical device or an aperture ratio, and the like.

For example, the height of the curved portion (H2 in FIGS. 3 to 6) may be in a range of 1 μm to 20 μm. In another example, the height may be 2 μm or more, 3 μm or more, 4 μm or more, 5 μm or more, 6 μm or more, 7 μm or more, 8 μm or more, 9 μm or more, 10 μm or more, or 11 μm or more. In another example, the height may also be 19 μm or less, 18 μm or less, 17 μm or less, 16 μm or less, 15 μm or less, 14 μm or less, 13 μm or less, 12 μm or less, or 11 μm or less.

The width of the curved portion (W2 in FIGS. 3 to 6) may be in a range of 2 μm to 40 μm. In another example, the width may be 4 μm or more, 6 μm or more, 8 μm or more, 10 μm or more, 12 μm or more, 14 μm or more, 16 μm or more, 18 μm or more, 20 μm or more, or 22 μm or more. In another example, the width may be 38 μm or less, 36 μm or less, 34 μm or less, 32 μm or less, 30 μm or less, 28 μm or less, 26 μm or less, 24 μm or less, or 22 μm or less.

When the spacer has the shape as shown in FIG. 3 or 4, the height of the spacer may be the same as the height of the curved portion, and when the spacer has the shape as shown in FIGS. 5 and 6, it may be a value obtained by adding the height (H1) of a columnar portion to the height of the curved portion. In one example, the height may be in a range of 1 μm to 50 μm.

In another example, the height may be 3 μm or more, 5 μm or more, 7 μm or more, 9 μm or more, 11 μm or more, 13 μm or more, 15 μm or more, 17 μm or more, 19 μm or more, 21 μm or more, 23 μm or more, 25 μm or more, or 27 μm or more. In another example, the height may be 48 μm or less, 46 μm or less, 44 μm or less, 42 μm or less, 40 μm or less, 38 μm or less, 36 μm or less, 34 μm or less, 32 μm or less, 30 μm or less, 28 μm or less, or 26 μm or less.

By controlling the dimension of the spacer including or not including a column portion as above, the uniform orientation treatment can be performed even with respect to the alignment film formed on the top of the spacer and the uniform cell gap can be maintained, and thus when the substrate has been applied to production of an optical device, the performance of the relevant device can be excellently maintained.

The spacer can be produced, for example, by mixing the above-mentioned dye or pigment for darkening at a suitable ratio with the resin used for manufacturing the column spacer and the like. In one example, the spacer may be formed by incorporating an ultraviolet curable resin together with the above-mentioned pigment or dye. For example, it may be formed by curing the ultraviolet curable compound in a state where the shape of the ultraviolet curable compound is maintained in a state capable of forming a desired shape by an imprinting method to be described below, where the ultraviolet curable resin, which is a cured product of the ultraviolet curable compound, can form the spacer. The specific kind of ultraviolet curable compound that can be used for forming the spacer is not particularly limited, and for example, an acrylate-based polymer material or an epoxy-based polymer, and the like may be used, without being limited thereto.

In the present application, the manner of producing the spacer of the above-described type by applying such a material is not particularly limited, but in order to manufacture the hemispherical spacer having excellent adhesion according to the desired design content, it is necessary to apply the following imprinting method described herein.

Figure 13:
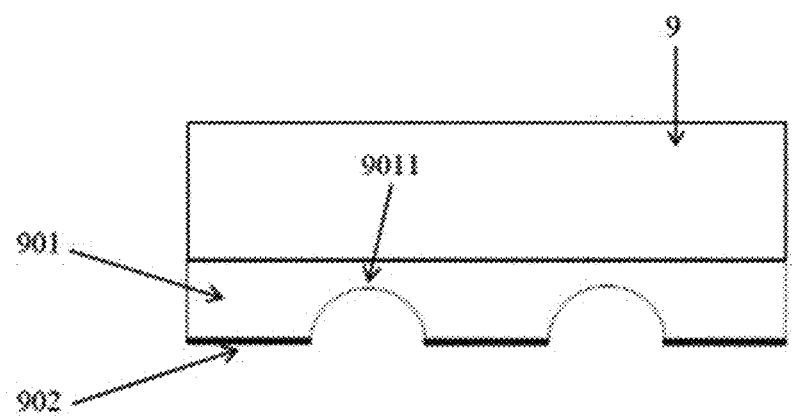
FIG. 13 is a diagram showing a shape of a mask that can be used for manufacturing spacers in accordance with the present disclosure.

The spacer can be produced by applying an imprinting mask including a light-shielding layer as schematically shown in FIG. 13. The mask of FIG. 13 has a form that a concave hemispherical shape (9011) is formed on one surface of a light-transmissive, for example, ultraviolet-transmissive, main body, and the light-shielding film (902) is formed on a portion where the hemispherical shape is not formed on the surface on which the hemispherical shape (9011) is formed. As shown in the drawing, the hemispherical shape (9011) may be produced by forming an imprinting mold (901) on one side of the main body (9) of the imprinting mask and forming the hemispherical shape (9011) and the light-shielding film (902) on the mold (901). If necessary, the surface on which the light-shielding film (902) is formed may be subjected to appropriate mold releasing treatment.

Figure 14:
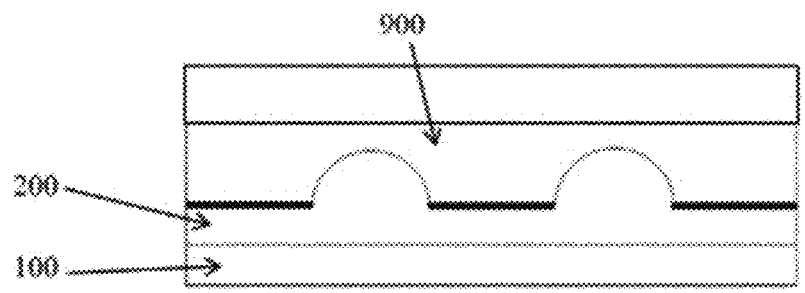
FIG. 14 is a schematic diagram of a process of manufacturing spacers using the mask of FIG. 13.

An exemplary process for producing the spacer using the mask having the same shape as above is shown in FIG. 14. As in FIG. 14, a layer (200) of an ultraviolet curable compound is first formed on a surface of the base layer (100) and the concave portion of the mask (900) is pressed on the layer (200). Then, if the layer (200) of the compound is cured by irradiating the top of the mask (900) with ultraviolet light or the like, the compound is cured according to the hemispherical shape formed on the mask (900) to form a spacer. Then, the spacer can be formed in the form fixed on the base layer (100) by removing the mask (900) and removing the uncured compound.

The desired, such as a hemispherical or hemispherical columnar spacer, can be manufactured by adjusting the quantity of ultraviolet light to be irradiated, the degree of pressing of the mask and/or the hemispherical shape of the mask (900) and the like in the above process.

Although FIG. 14 shows a method of using a mask for manufacturing hemispherical spacers, the shape of the spacer is not limited, as described above, and thus the shape of the mask can be changed according to the shape of the desired spacer.

The substrate of the present application may comprise, in addition to the base layer and the spacers, other elements required for driving the optical device. These elements are variously known, and typically, there is an electrode layer or the like. In one example, the substrate may further comprise an electrode layer between the base layer and the spacers. As the electrode layer, a known material can be applied. For example, the electrode layer may comprise a metal alloy, an electrically conductive compound or a mixture of two or more thereof. Such a material can be exemplified by a metal such as gold, CuI, an oxide material such as ITO (indium tin oxide), IZO (indium zinc oxide), ZTO (zinc tin oxide), zinc oxide doped with aluminum or indium, magnesium indium oxide, nickel tungsten oxide, ZnO, $SnO_2$ or $In_2O_3$, a metal nitride such as gallium nitride, a metal selenide such as zinc selenide, a metal sulfide such as zinc sulfide, or the like. A transparent positive hole injecting electrode layer can also be formed by using a laminate of a metal thin film of Au, Ag or Cu, and the like, and a transparent material having high refractive index such as ZnS, $TiO_2$ or ITO.

The electrode layer may be formed by any means such as vapor deposition, sputtering, chemical vapor deposition or electrochemical means. Patterning of the electrode layer is also possible in a known manner without any particular limitation, and the electrode layer may be patterned, for example, through known photolithography or a process using a shadow mask or the like.

The substrate of the present application may further comprise an alignment film present on the base layer and the spacers.

Thus, another exemplary substrate of the present application may comprise a base layer; spacers present on the base layer; and an alignment film formed on the base layer and the spacers.

Here, the details of the base layer and the spacer are as described above.

In addition, the kind of the alignment film formed on the base layer and the spacers is not particularly limited, where a known alignment film, for example, a known rubbing alignment film or a photo-alignment film can be applied.

A method of forming the alignment film on the base layer and the spacers and performing orientation treatment thereon is also in accordance with a known method.

Figure 15:
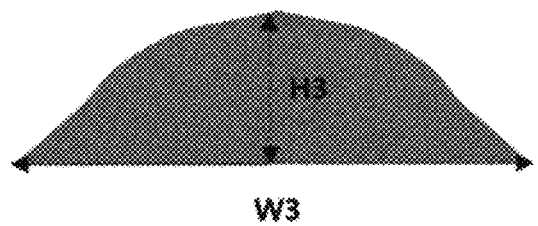
FIGS. 15 and 16 are schematic diagrams of exemplary cross sections of alignment films formed on spacers in accordance with the present disclosure.

However, if the alignment film is formed on the above-described hemispherical spacer in one example, the alignment film may also have a unique shape depending on the shape of the spacer. FIG. 15 is a diagram schematically showing the cross-sectional trajectory of such an alignment film. FIG. 15 is an example of a cross-sectional shape of an alignment film formed on the spacer, where the top shows a curved shape in which the curvature center is formed on the inner side of the cross section while having predetermined width (W3) and height (H3).

For example, the alignment film may also comprise the above-described hemispherical portion on the top. In this case, the hemispherical portion may have a maximum curvature of the cross-sectional trajectory of 2,000 mm$^{-1}$ or less. In another example, the maximum curvature may be 1,800 mm$^{-1}$ or less, 1,600 mm$^{-1}$ or less, 1,400 mm$^{-1}$ or less, 1,200 mm$^{-1}$ or less, 1,000 mm$^{-1}$ or less, 900 mm$^{-1}$ or less, 950 mm$^{-1}$ or less, 800 mm$^{-1}$ or less, 750 mm$^{-1}$ or less, 700 mm$^{-1}$ or less, 650 mm$^{-1}$ or less, 600 mm$^{-1}$ or less, 550 mm$^{-1}$ or less, 500 mm$^{-1}$ or less, 450 mm$^{-1}$ or less, 400 mm$^{-1}$ or less, 350 mm$^{-1}$ or less, 300 mm$^{-1}$ or less, 250 mm$^{-1}$ or less, 200 mm$^{-1}$ or less, or 150 mm$^{-1}$ or less or so. In another example, the maximum curvature may be 5 mm$^{-1}$ or more, 10 mm$^{-1}$ or more, 15 mm$^{-1}$ or more, 20 mm$^{-1}$ or more, 25 mm$^{-1}$ or more, 30 mm$^{-1}$ or more, 40 mm$^{-1}$ or more, 45 mm$^{-1}$ or more, or 50 mm$^{-1}$ or more.

The cross-sectional trajectory of the curved portion of the alignment film may or may not include a portion having curvature of 0, that is, a linear portion.

The height and width of the alignment film formed on the spacer as above are also determined according to the height and width of the spacer existing on the bottom and the thickness of the formed alignment film, and the like, which are not particularly limited.

For example, the height of the curved portion (H3 in FIG. 15) may be in a range of 1 μm to 50 μm. In another example, the height may be 2 μm or more, 3 μm or more, 4 μm or more, 5 μm or more, 6 μm or more, 7 μm or more, 8 μm or more, 9 μm or more, 10 μm or more, or 11 μm or more. In another example, the height may also be 48 μm or less, 46 μm or less, 44 μm or less, 42 μm or less, 40 μm or less, 38 μm or less, 36 μm or less, 34 μm or less, 32 μm or less, 30 μm or less, 28 μm or less, 26 μm or less, 24 μm or less, 22 μm or less, 19 μm or less, 18 μm or less, 17 μm or less, 16 μm or less, 15 μm or less, 14 μm or less, 13 μm or less, 12 μm or less, or 11 μm or less.

In addition, the width of the curved portion (W3 in FIG. 15) may be in a range of 1 μm to 80 μm. In another example, the width may be 2 μm or more, 3 μm or more, 4 μm or more, 6 μm or more, 8 μm or more, 10 μm or more, 12 μm or more, 14 μm or more, 16 μm or more, 18 μm or more, 20 μm or more, or 22 μm or more. In another example, the width may be 78 μm or less, 76 μm or less, 74 μm or less, 72 μm or less, 70 μm or less, 68 μm or less, 66 μm or less, 64 μm or less, 60 μm or less, 58 μm or less, 56 μm or less, 54 μm or less, 52 μm or less, 50 μm or less, 48 μm or less, 46 μm or less, 44 μm or less, 42 μm or less, 40 μm or less, 38 μm or less, 36 μm or less, 34 μm or less, 32 μm or less, 30 μm or less, 28 μm or less, 26 μm or less, 24 μm or less, or 22 μm or less.

In the case of the substrate of the present application, the orientation treatment of the alignment film formed on the spacer can be performed uniformly without being affected by the step of the spacer, by adjusting the shape of the spacer to a unique hemispherical shape.

In order to maximize this effect, the shape of the alignment film can be further controlled.

Figure 16:
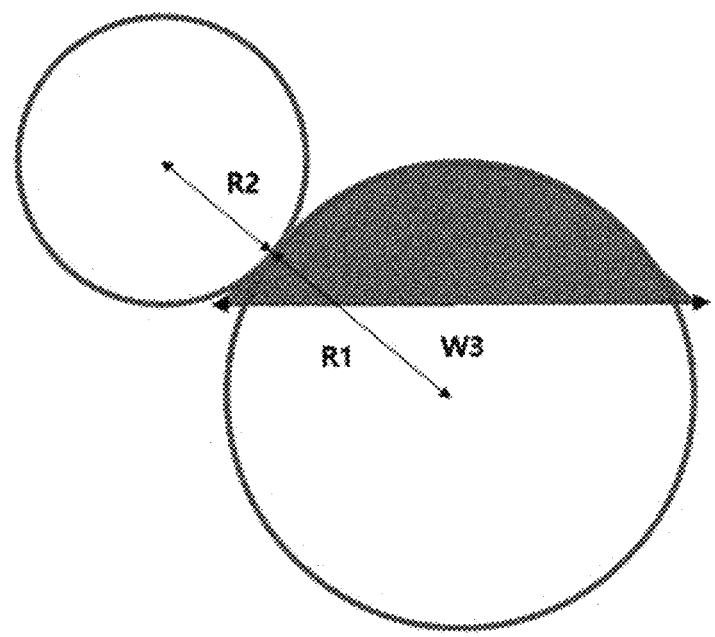

For example, as the cross section of the alignment film is shown in FIGS. 15 and 16, a region facing upward from a point in contact with the substrate layer in the cross section of the alignment film may be a curved line shape in which the curvature center is formed outside the cross section. This shape can be formed, for example, in accordance with the shape of the spacer and the formation conditions of the alignment film. Accordingly, even when the orientation treatment such as rubbing treatment is performed on the alignment film, the uniform orientation treatment which is not affected by the step of the spacer can be performed.

The base layer may comprise a plurality of spacers by comprising, including the hemispherical spacer as mentioned above, the same or different spacers. Such a plurality of spacers may be disposed on the base layer while having predetermined regularity and irregularity simultaneously. Specifically, at least a part of the plurality of spacers on the base layer may be in an irregular arrangement in terms of being arranged so as to have pitches different from each other, but may be regular in terms of being arranged with substantially the same density between regions determined according to a predetermined rule.

That is, in one example, at least a part of the spacers disposed on the base layer may be disposed so as to have pitches different from each other.

Here, when a part of the plurality of spacers have been selected so as to form a closed figure in a state where other spacers are not present therein, the term pitch can be defined as a length of a side of the closed figure. In addition, unless otherwise specified, the unit of the pitch is μm.

The closed figure thus formed may be a triangle, a quadrangle or a hexagon. That is, when three spacers among the plurality of spacers have been optionally selected and connected to each other, the triangle is formed; when four spacers have been selected and connected to each other, the quadrangle is formed; and when six spacers have been selected and connected, the hexagon is formed.

For example, if four spacers among the spacers existing on the base layer are optionally selected and connected by imaginary lines (dotted lines), a quadrangle which is a closed figure is formed. The closed figure formed at the time of determining the pitch is formed such that no spacer is present therein, and for example, if spacers constituting a closed figure are formed such that another spacer is present therein, it is not a closed figure determining the pitch.

In one example, the ratio (%) of the number of sides having the same length among sides of a triangle, a quadrangle or a hexagon, which is the closed figure thus formed (100×(number of sides of the same length)/3 in the case of a triangle, 100×(number of sides of the same length)/4 in the case of a hexagon, and 100×(number of sides of the same length)/6 in the case of a hexagon) can be 85% or less. In another example, the ratio may be 84% or less, 80% or less, 76% or less, 67% or less, 55% or less, or 40% or less. The lower limit of the ratio is not particularly limited. That is, in some cases, since the lengths of all sides of the closed figure may not be the same, the lower limit of the ratio may be 0%.

As described above, the arrangement of the spacers of the present application is irregular in that at least a part thereof has different pitches, but such irregularity is controlled under certain regularity. Here, the regularity may mean that the arrangement density of spacers is substantially close to each other between certain regions.

For example, if the normal pitch of the plurality of irregularly arranged spacers is P, when two or more square regions with 10P as a length of one side have been optionally selected on the surface of the base layer, the standard deviation of the number of spacers present in each square region is 2 or less.

Here, the term normal pitch means a distance between the centers of adjacent spacers in a state where the plurality of spacers, in actuality, irregularly disposed on the base layer are placed so that all of the spacers are virtually disposed at the same pitch in consideration of the number of the spacers and the area of the base layer.

The manner to confirm a virtual state where all of the above-mentioned spacers are disposed so as to have the same pitch is known, which can be achieved by using a random number generating program such as, for example, CAD, MATLAB, STELLA or Excel.

The standard deviation is a numerical value representing a degree of scattering of the number of the spacers, which is a numerical value determined by a positive square root of dispersion.

That is, when at least two or more of the rectangular regions have been optionally designated on the surface of the base layer that spacers are formed thereon and then the standard deviation of the numbers of spacers existing in the regions has been obtained, the standard deviation is 2 or less. In another example, the standard deviation may be 1.5 or less, 1 or less, or 0.5 or less. In addition, the standard deviation means that the lower the numerical value is, the desired regularity is achieved, and thus the lower limit is not particularly limited, which may be 0, for example.

Here, the number of the designated rectangular regions is not particularly limited as long as it is 2 or more, but in one example, it may be selected as the number that the rectangular regions are optionally selected so as not to overlap each other on the surface of the base layer, provided that the area occupied by the optionally selected regions is about 10% or more, 20% or more, 30% or more, 40% or more, 50% or more, 60% or more, 70% or more, 80% or more, or 90% or more of the total area of the base layer.

The range of the normal pitch (P) forming one side of the arbitrary rectangular region can be determined by the number of spacers present on the base layer and the area of the relevant base layer, as described above, which is not particularly limited, and usually, it may be determined in a range of 100 μm to 1,000 μm.

Although not particularly limited, the average number of spacers present in optionally selected square regions as above may be, for example, about 80 to 150 or so. In another example, the average number may be 82 or more, 84 or more, 86 or more, 88 or more, 90 or more, 92 or more, 94 or more, 96 or more, or 98 or more. Also, in another example, the average number may be 148 or less, 146 or less, 144 or less, 142 or less, 140 or less, 138 or less, 136 or less, 134 or less, 132 or less, 130 or less, 128 or less, 126 or less, 124 or less, 122 or less, 120 or less, 118 or less, 116 or less, 114 or less, or 112 or less.

Also, the ratio (SD/A) of the average number (A) of the spacers and the above-mentioned standard deviation (SD) may be 0.1 or less. In another example, the ratio may be 0.09 or less, 0.08 or less, 0.07 or less, 0.06 or less, 0.05 or less, 0.04 or less, or 0.03 or less.

The average number (A) or the ratio (SD/A) may be optionally changed, and for example, the numerical value may be changed in consideration of the transmittance, the cell gap and/or the uniformity of the cell gap required in the device to which the substrate is applied, and the like.

In another example, when the surface of the base layer on which the irregularly disposed spacers are formed has been divided into two or more regions having the same area, the standard deviation of the number of the spacers in each unit region may be 2 or less.

Here, the meaning of the standard deviation and the specific examples thereof are as described above.

That is, in the example, when the base layer has been divided into at least two regions having the same area and the standard deviation of the number of the spacers present in each divided unit region has been obtained, the standard deviation thereof is 2 or less. In this case, the shape of each divided unit region is not particularly limited as long as the relevant unit regions are divided so as to have the same area, but it may be, for example, a triangular, square, or hexagonal region. In addition, in another example, the standard deviation in the above state may be 1.5 or less, 1 or less, or 0.5 or less, and the lower limit thereof is not particularly limited, as described above, which may be 0, for example.

Here, the number of unit regions is not particularly limited, but in one example, the base layer may be divided into two or more, four or more, six or more, eight or more, or ten or more regions having the same area. Here, since it means that the higher the number of the divided regions, the more uniform the density of the spacers is maintained, the upper limit of the number of divided regions is not particularly limited.

When the virtual square region with P, which is a normal pitch, as one side has been selected on the substrate on which the plurality of spacers are disposed so as to have regularity and irregularity simultaneously, the average number of spacers existing in the relevant region may be in a range of 0 to 4. In another example, the average number may be 3.5 or less, 3 or less, 2.5 or less, 2 or less, or 1.5 or less. Also, in another example, the average number may be 0.5 or more. Here, the number of square regions of which the length of one side is optionally designated as the normal pitch (P) is not particularly limited as long as it is two or more, but in one example, it may be selected as the number that the square regions are optionally selected so as not to overlap each other on the surface of the base layer, provided that the area occupied by the optionally selected region is about 10% or more, 20% or more, 30% or more, 40% or more, 50% or more, 60% or more, 70% or more, 80% or more, or 90% or more of the total area of the base layer.

The entire density of the plurality of spacers can be adjusted so that the ratio of the area occupied by the spacers is about 50% or less relative to the total area of the base layer. In another example, the ratio may be about 45% or less, about 40% or less, about 35% or less, about 30% or less, about 25% or less, about 20% or less, about 15% or less, about 10% or less, about 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, or 1.5% or less. In another example, the ratio may be about 0.1% or more, 0.2% or more, 0.3% or more, 0.4% or more, 0.5% or more, 0.6% or more, 0.7% or more, 0.8% or more, 0.9% or more, or 0.95% or more.

When an optical device has been implemented by disposing a plurality of spacers on the base layer in the above form, the uniform optical characteristics can be ensured without causing the so-called moire phenomenon, while the spacers maintain the uniform pitch (cell gap) between the substrates.

The respective numerical values may be changed, if necessary, and for example, the numerical values may be changed in consideration of the transmittance, the cell gap and/or the uniformity of the cell gap required in the device to which the substrate is applied, and the like.

The plurality of spacers may be arranged such that their spacing normal distribution diagram represents a predetermined shape.

Here, the spacing normal distribution diagram is a distribution diagram showing the pitch between the spacers as the X-axis and the ratio of the spacers having the relevant pitch among all the spacers as the Y-axis, where the ratio of the spacers is a ratio obtained when the number of the entire spacer has been 1.

The pitch in the description related to the spacing normal distribution diagram herein is a length of sides in a triangle, a quadrangle or a hexagon, which is the above-mentioned closed figure.

The distribution diagram can be obtained using a known random number coordinate program, for example, a CAD, MATLAB or STELLA random number coordinate program or the like.

In one example, the plurality of spacers may be disposed such that a half height area in the distribution diagram is in a range of 0.4 to 0.95. In another example, the half height area may be 0.6 or more, 0.7 or more, or 0.85 or more. Also, in another example, the half height area may be 0.9 or less, 0.85 or less, 0.8 or less, 0.75 or less, 0.7 or less, 0.65 or less, 0.6 or less, 0.55 or less, or 0.5 or less.

The plurality of spacers may be arranged such that a ratio (FWHM/Pm) of the half height width (FWHM) to the average pitch (Pm) in the distribution diagram is 1 or less. In another example, the ratio (FWHM/Pm) may be 0.05 or more, 0.1 or more, 0.11 or more, 0.12 or more, or 0.13 or more. Also, in another example, the ratio (FWHM/Pm) is about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, about 0.45 or less, or about 0.4 or less.

When at least 80% or more, 85% or more, 90% or more, or 95% or more of spacers have been selected to form a triangle, quadrangle or hexagon, which is the above-described closed figure, the above-mentioned average pitch (Pm) is an average of the lengths of the respective sides of the triangle, quadrangle or hexagon formed by the selected spacers. Here, the spacers are also selected so that the formed triangles, quadrangles or hexagons do not share vertexes with respect to each other.

The plurality of spacers may be disposed such that the half height width (FWHM) in the distribution diagram is in a range of 0.5 μm to 1,000 μm. In another example, the half height width (FWHM) may be about 1 μm or more, 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, 19 μm or more, 20 μm or more, 21 μm or more, 22 μm or more, 23 μm or more, or 24 μm or more. In another example, the half height width (FWHM) may be about 900 μm or less, 800 μm or less, 700 μm or less, 600 μm or less, 500 μm or less, 400 μm or less, 300 μm or less, 200 μm or less, 150 μm or less, 100 μm or less, 90 μm or less, 80 μm or less, 70 μm or less, 60 μm or less, 50 μm or less, 40 μm or less, or 30 μm or less.

The plurality of spacers may be disposed such that the maximum height (Fmax) of the spacing normal distribution diagram is 0.006 or more and less than 1. In another example, the maximum height (Fmax) may be about 0.007 or more, about 0.008 or more, about 0.009 or more, or about 0.0095 or more. Also, in another example, the maximum height (Fmax) may be about 0.9 or less, about 0.8 or less, about 0.7 or less, about 0.6 or less, about 0.5 or less, about 0.4 or less, about 0.3 or less, about 0.2 or less, about 0.1 or less, about 0.09 or less, about 0.08 or less, about 0.07 or less, about 0.06 or less, about 0.05 or less, about 0.04 or less, about 0.03 or less, or about 0.02 or less.

When an optical device has been implemented by disposing a plurality of spacers on to have the spacing normal distribution diagram in such a form, the uniform optical characteristics can be ensured without causing the so-called moire phenomenon, while the spacers maintain the uniform pitch (cell gap) between the substrates.

The concept of degree of irregularity is introduced for a plurality of spacers to be disposed so as to simultaneously have irregularity and regularity as above. Hereinafter, a method for designing the arrangement of the spacers having such a form will be described.

In order to achieve the arrangement of the spacers having the above-mentioned regularity and irregularity simultaneously, a step of starting from a normal arrangement state and relocating the spacers to have irregularity is performed.

Figure 17:
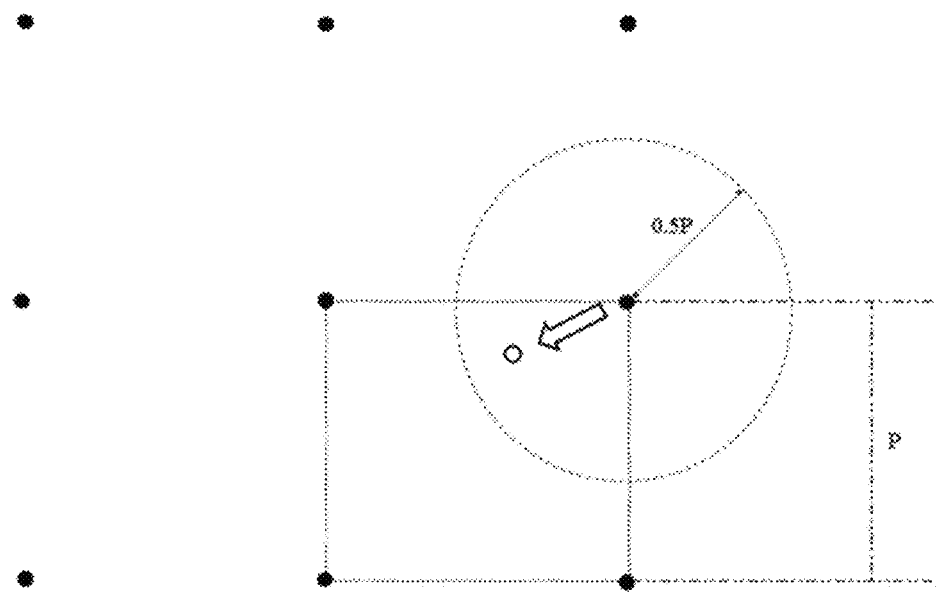
FIG. 17 is a diagram for explaining a method of implementing a degree of irregularity in accordance with the present disclosure.

Here, the normal arrangement state is a state where the plurality of spacers are disposed on the base layer such that a regular triangle, a square or a regular hexagon in which all sides have the same length can be formed. FIG. 17 is a state in which spacers are disposed to form the square as an example. The length P of one side of the square in this state may be equal to the above-mentioned normal pitch. In such an arrangement state, a circle region having a radius of a length proportional to the length P of one side is designated on the basis of a point where one spacer exists, and the program is set so that the one spacer can be randomly moved in the region. For example, FIG. 17 schematically shows a form in which the circle region having the radius of the length of 50% (0.5P) relative to the length P is set and the spacer moves to any point in the region. The above-described arrangement can be achieved by applying such a movement to spacers of at least 80% or more, 85% or more, 90% or more, 95% or more, or 100% (all spacers).

In such a design method, the ratio for the length P which becomes the radius of the circle region may be defined as a degree of irregularity. For example, in the case shown in FIG. 17, the degree of irregularity is about 50%.

In one example, the degree of irregularity in the design manner may be about 5% or more, about 10% or more, about 15% or more, about 20% or more, about 25% or more, about 30% or more, about 35% or more, about 40% or more, about 45% or more, about 50% or more, about 55% or more, about 60% or more, or about 65% or more. In one example, the degree of irregularity may be about 95% or less, about 90% or less, about 85% or less, or about 80% or less.

The arrangement having the above-described irregularity and regularity simultaneously can be achieved by designing the arrangement of the spacers in the same manner as above and forming the spacers according to the designed arrangement.

Also, here, although the case where the normal state starts from the square has been exemplified, the normal state may be other figures such as a regular triangle or a regular hexagon, and in this case, the above-described arrangement can also be achieved.

Furthermore, the means for designing the arrangement of the spacers in the same manner as above is not particularly limited, and a known random number coordinate program such as, for example, a CAD, MATLAB, STELLA or Excel random number coordinate program can be used.

For example, after the arrangement of the spacers is first designed in the same manner as above, a mask having a pattern according to the relevant design and the like may be manufactured, and such spacers may be implemented by applying the relevant mask to the above-described lithography or imprinting method, and the like.

The spacer of the present application exhibits excellent adhesion to the base layer or an element (for example, the electrode layer) of the base layer that the spacer contacts.

For example, even if a pressure-sensitive adhesive tape having peel force in a level of about 3.72N/10 mm to 4.16N/10 mm is attached to the surface of the base layer on which the spacers are formed and the adhesive tape is peeled off, the pattern of the spacers can be maintained substantially without being lost. At this time, the pressure-sensitive adhesive tape may be, for example, a tape known as Nichiban tape CT-24. The Nichiban tape has the peel force in a level of about 3.72N/10 mm to 4.16N/10 mm as measured at a peel angle of 180 degrees in accordance with JIS Z 1522 standard. The loss rate of the spacers measured by attaching the Nichiban tape CT-24 to the surface of the base layer, on which the spacers are formed, with a rectangular attachment area of 24 mm in width and 40 mm in length and then peeling the Nichiban tape CT-24 in the longitudinal direction at a peel rate of about 30 mm/s and a peel angle of about 180 degrees may be 15% or less, 13% or less, 11% or less, 9% or less, 8% or less, 7% or less, 6% or less, 5% or less, 4% or less, 3% or less, 2% or less, 1% or less, or 0.5% or less. Here, the loss rate may be a percentage of the number of spacers that have been lost after peeling the pressure-sensitive adhesive tape off relative to the number of all the spacers existing within the attachment area. Depending on the applied use, usually 10,000 to 40,000 spacers may be present in the above attachment area, where the ratio of the spacers to be lost among these spacers may be maintained in the above range.

In the case of the black spacer, in order to satisfy the above-mentioned optical density, a darkening material such as a dye or a pigment is included, where the curing rate of the spacer material is inhibited due to such a darkening material, so that it is very difficult to form a spacer having excellent adhesion as above. However, the spacer produced in the manner referred to in the present application may have excellent adhesion while having the above-described optical density due to its specific hemispherical shape and manufacturing method.

When the spacers exhibit this adhesion, the spacers can be stably maintained even in the case where an alignment film is formed on the surface of the spacers and the orientation treatment such as rubbing is performed, so that it is possible to finally manufacture a product having excellent performance In addition, the substrate on which the spacers are formed can be maintained in a state where a protective pressure-sensitive adhesive film is attached to the surface on which the spacers are formed until it is applied to an actual product, where in such a structure, the pattern can be stably maintained without being lost even when the pressure-sensitive adhesive film is peeled off.

In one example, the substrate may comprise a protective film as an additional configuration. For example, the substrate may further comprise a protective pressure-sensitive adhesive film attached to the surface of the base layer where the spacers are formed. As the pressure-sensitive adhesive film in the above configuration, a known protective pressure-sensitive adhesive film can be used without any particular limitation.

Figure 18:
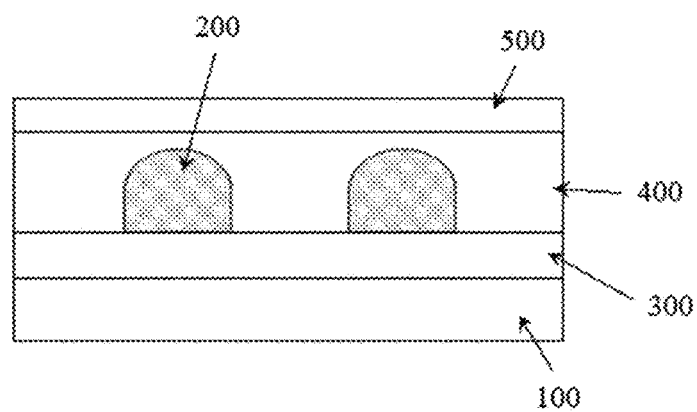

FIG. 18 is a form that the protective film is attached on the substrate shown in FIG. 2, where the protective film usually comprises a base film (500) and a pressure-sensitive adhesive layer (400) formed on one surface thereof.

The present application also relates to a method for producing the substrate. The production method may comprise a step of curing a photocurable material for forming the black column spacers formed on the base layer in a state where the photocurable material is pressed by an imprinting mask containing a light-shielding layer. The type of photocurable material to be applied in the above is not particularly limited, where a known black column spacer material can be used and in one example, a material obtained by mixing a darkening material such as a pigment or a dye with the ultraviolet curable resin can be used.

Furthermore, as the imprinting mask including the light-shielding layer, for example, a mask exemplarily shown in FIG. 13 may be used. Therefore, the imprinting mask including the light-shielding layer may have a form that concave hemispherical shape (9011 in FIG. 13) is formed on one surface of a light-transmissive main body (9 in FIG. 13), and the light-shielding film (902 in FIG. 13) is formed on the surface where the hemispherical shape is not formed in the side on which the hemispherical shape is formed, and as described above with reference to FIG. 14, the photocurable material can be cured in a state where the surface on which the concave hemispherical shape of the mask as above is formed is in close contact with the photocurable material.

At this time, an electrode layer is formed on the base layer, where the photocurable material can be formed on the electrode layer.

The spec (for example, diameter or height, etc.) of the concave portion formed in the above process is not particularly limited and it can be formed in accordance with the desired hemispherical shape. That is, since the height, the width, and the like of the above-described hemispherical shape are approximately followed by the shape of the concave portion of the mask, the hemispherical shape can be controlled through this. Also, the quantity of light, for example, ultraviolet light, to be irradiated is adjustable considering the used materials.

The present application also relates to an optical device formed using such a substrate.

An exemplary optical device of the present application may comprise the substrate and a second substrate disposed opposite to the substrate and maintaining a gap with the substrate by the spacer in the substrate.

In the optical device, a light modulation layer may be present in a gap between two substrates. In the present application, the term light modulation layer may include all known types of layers capable of changing at least one characteristic among characteristics such as polarization states, transmittance, color tones and reflectance of incident light depending on purposes.

For example, the light modulation layer is a layer comprising a liquid crystal material, which may be a liquid crystal layer switched between a diffusion mode and a transparent mode by on-off of a voltage, for example, a vertical electric field or a horizontal electric field, a liquid crystal layer switched between a transparent mode and a blocking mode, a liquid crystal layer switched between a transparent mode and a color mode, or a liquid crystal layer switched between color modes of different colors.

The light modulation layers capable of performing the actions as above, for example, liquid crystal layers, are variously known. As one exemplary light modulation layer, a liquid crystal layer used in a typical liquid crystal display can be used. In another example, the light modulation layer may also be various types of so-called guest host liquid crystal layers, polymer dispersed liquid crystal layers, pixel-isolated liquid crystal layers, suspended particle devices or electrochromic devices, and the like.

The polymer dispersed liquid crystal layer (PDLC) is a superordinate concept including a PILC (pixel isolated liquid crystal), a PDLC (polymer dispersed liquid crystal), a PNLC (polymer network liquid crystal) or a PSLC (polymer stabilized liquid crystal), and the like. The polymer dispersed liquid crystal layer (PDLC) may comprise, for example, a liquid crystal region containing a polymer network and a liquid crystal compound dispersed in a state of being phase-separated from the polymer network.

The implementation manner or form of the light modulation layer is not particularly limited, and any known method may be employed without any limitation depending on purposes.

In addition, the optical device may further comprise additional known functional layers, such as a polarizing layer, a hard coating layer and/or an antireflection layer, if necessary.

Advantageous Effects

The present application relates to a substrate on which a spacer is formed and an optical device using such a substrate. The present application can provide a substrate which can be applied to an optical device capable of adjusting light transmittance, colors and/or reflectance, thereby preventing occurrence of light leakage or the like upon driving of the device and ensuring uniform optical performance.

MODE FOR INVENTION

Hereinafter, the present application will be specifically described by way of examples, but the scope of the present application is not limited by the following examples.

Optical Density (OD) Confirmation

Hereinafter, the optical density described in Examples or Comparative Examples or the optical density (OD) mentioned in Examples or Comparative Examples is a result as measured in the following manner.

Each UV resin used in production of column spacers in Examples or Comparative Examples is coated on a base layer such as a PET (poly(ethylene terephthalate)) film or a PC (polycarbonate) film or a transparent layer (for example, ITO (indium tin oxide), FTO (fluorine doped tin oxide), etc.) formed on the base layer so as to form a layer, irradiated with ultraviolet light (wavelength: about 365 nm, ultraviolet irradiance level: 2,200 to 4,400 mJ/cm$^2$) and cured to form a layer having a thickness of 12 μm or so.

The thickness of the cured layer is measured using an Optical Profiler measuring instrument (manufacturer: Nano System, trade name: Nano View-E1000). Subsequently, the transmittance and the optical density of the formed layer are measured using a measuring device (manufacturer: x-rite, trade name: 341C). The measuring instrument is an instrument that measures the transmittance (unit: %) (T) for light in a wavelength range of visible light (400 to 700 nm) and obtains the optical density (D) through it, where the optical density is obtained for the relevant thickness (12 μm) by substituting the measured transmittance (T) into the equation (optical density (OD)=−log$_{10}$ (T), where T is the transmittance).

Example 1

An imprinting mask containing a light-shielding layer of the type as shown in FIG. 13 was produced and hemispherical black spacers were produced using the same. According to the form shown in FIG. 13, the imprinting mask was produced by forming concave portions (9011) on a PET (poly(ethylene terephthalate)) main body (9) through an imprinting mold (901), forming a black layer (AlOxNy) (902) on the surface on which no concave portion (9011) was formed and then forming a release layer on the black layer (902) and the concave portions (9011). At this time, the concave portion was formed into a hemispherical shape having a width in a range of approximately 24 μm to 26 μm and a height of approximately 9 μm to 10 μm or so. In addition, the concave portions were formed such that the arrangement of the spacers was such that the degree of irregularity described in FIG. 17 was about 70% or so.

A crystalline ITO (indium tin oxide) electrode layer was formed on the PET (poly(ethylene terephthalate)) base layer.

Subsequently, about 2 to 3 mL of a black UV resin prepared by mixing a mixture (UV resin) of a conventional ultraviolet curable acrylate binder, an initiator and a dispersing agent used in the production of column spacers with carbon black as a darkening material at a ratio of about 3 wt % was dropped on the electrode layer, the dropped mixture was pressed with the imprinting mask, and irradiated with ultraviolet light in a state where a laminate comprising the base layer, the electrode layer, the black layer, the UV resin layer and the imprinting mask layer was formed, to cure the UV resin layer (ultraviolet irradiance level: 1,200 mJ/cm$^2$). The optical density of the black UV resin material was about 1.9 when measured in the above-mentioned manner. Through such a process, the condensing effect of the lens by the concave pattern of the mask (900) can be obtained, thereby increasing the degree of curing of the cured portion even when the ultraviolet irradiance level was reduced in the state containing the darkening material. In addition, a pattern of spacers having a size equal to the design size of the mask can be produced, whereby it is possible to manufacture spacers like those originally designed. Furthermore, a hemispherical pattern in which the curvature of the concave portion of the mask is reflected can be produced.

Figure 19:
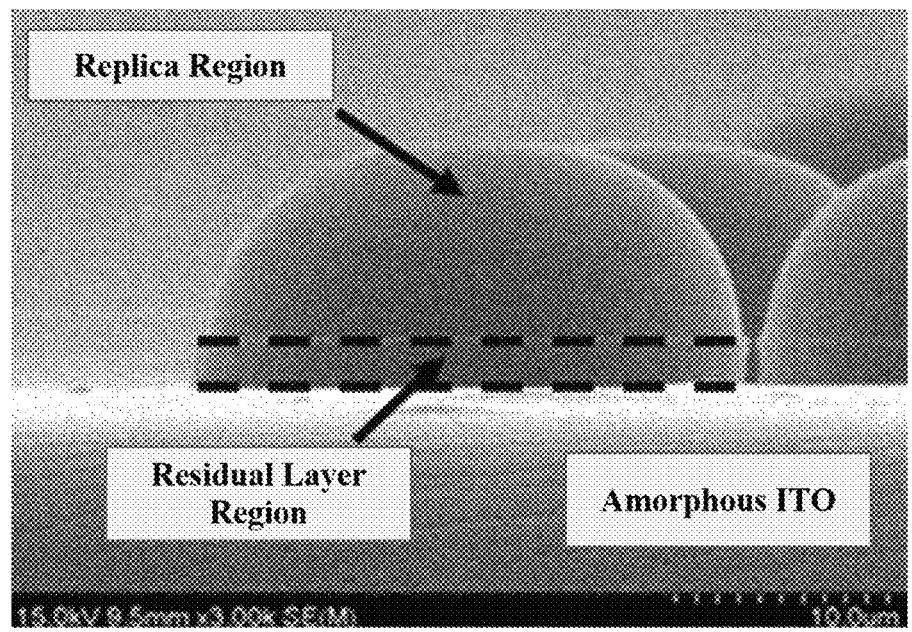
FIGS. 19 and 20 are photographs of hemispherical spacers produced in Examples of the present disclosure.

After ultraviolet irradiation, the uncured UV resin layer (200) was removed (developed) to form black hemispherical spacers. FIG. 19 shows a photograph of a hemispherical spacer manufactured in the above manner. In FIG. 19, the hemispherical spacer includes a portion (Replica region) reflecting the shape (hemisphere) of the imprinting mask and a residual layer reflecting the imprinting travel. The hemispherical spacers exhibited a height (Replica region+residual layer region) distribution of about 10.5 μm to 12 μm (average: 11.26 μm) and a diameter distribution of about 25 to 26 μm (average: 25.1 μm).

Example 2

Figure 20:
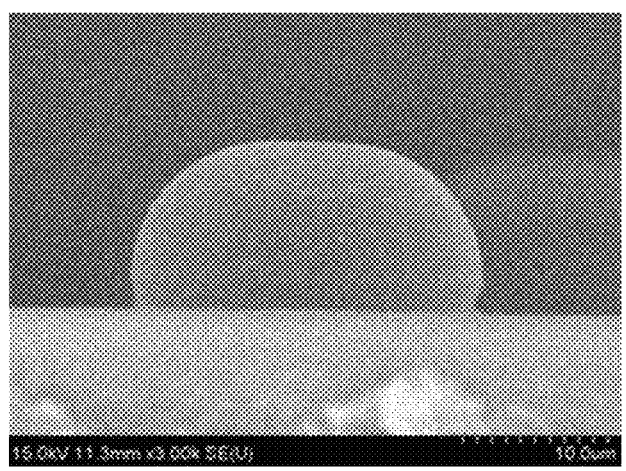

Spacers were produced in the same manner as in Example 1, except that the ratio of carbon black was adjusted to about 2 wt % upon production of the black UV resin. The optical density of the black UV resin material was about 1.3 when measured in the above-mentioned manner. FIG. 20 shows a photograph of a hemispherical spacer manufactured in the above manner. As in the case of FIG. 19, the hemispherical spacer of FIG. 20 also includes a portion (Replica region) reflecting the shape (hemisphere) of the imprinting mask and a residual layer reflecting the imprinting travel. The hemispherical spacers exhibited a height (Replica region+residual layer region) distribution of about 10.5 μm to 12 μm (average: 11.26 μm) and a diameter distribution of about 23 μm to 25.5 μm (average: 24.1 μm).

Comparative Examples 1 and 2

Figure 21:
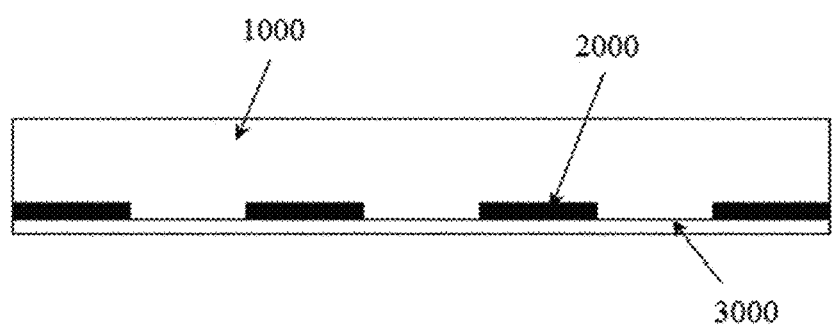
FIG. 21 is a diagram of a mask applied to spacer production of Comparative Examples of the present disclosure.

A black column spacer was produced using a known plane photomask as shown in FIG. 21. The photomask including the light-shielding layer was a product that a light-shielding layer (2000) was formed on one side of a main body (1000) as a polyester film, and then a protective layer (3000) was formed thereon, as shown in FIG. 21, where a commercial product from Corelink Co., Ltd. was applied. The exposure pattern of the photomask has a circular shape with a diameter of about (25±2) μm.

As the black UV resin, one obtained by introducing black ball spacers for controlling the pattern thickness in a predetermined amount into the same black UV resin as that applied in Example 1 was used. The optical density of the black UV resin was about 1.9 when measured in the above-mentioned manner. After the black UV resin was dropped on a base material having an ITO electrode layer formed on one surface in the same manner as applied in Example 1, the dropped black UV resin was pressed by the photomask to form a laminate including the base layer, the electrode layer, the UV resin layer and the photomask layer, and then irradiated with ultraviolet light, and the uncured black UV resin layer was removed to produce black column spacers.

Figure 22A:
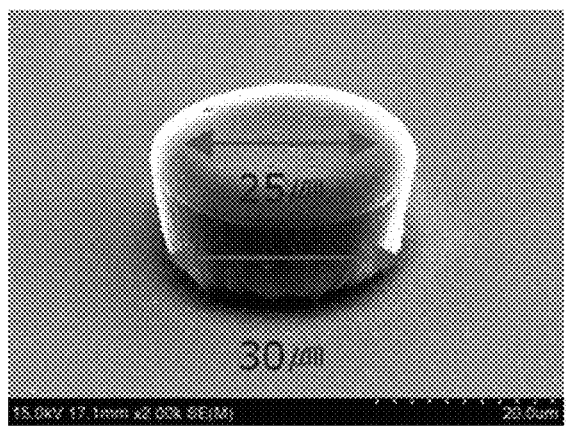
FIGS. 22A-B are photographs of spacers formed in Comparative Examples of the present disclosure.
Figure 22B:
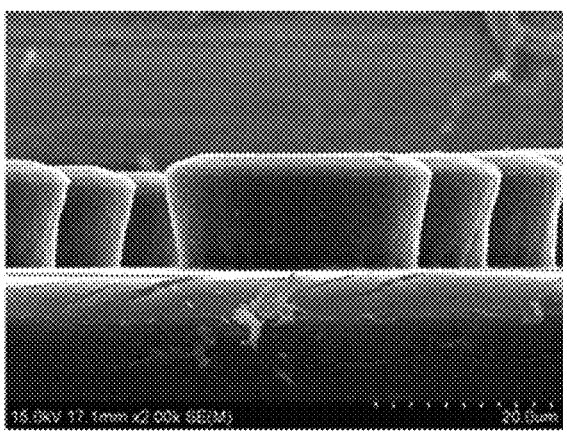
Figure 23A:
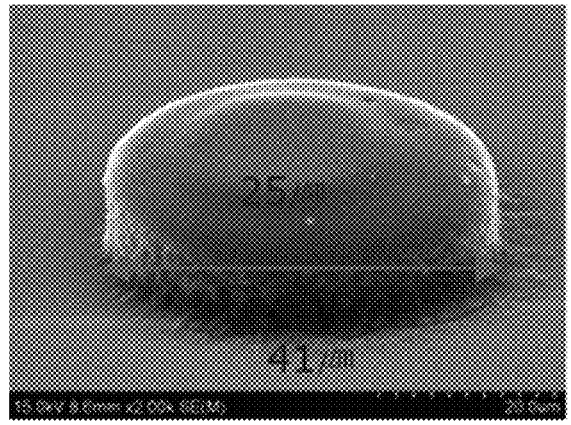
FIGS. 23A-B are photographs of spacers formed in Comparative Examples of the present disclosure.
Figure 23B:
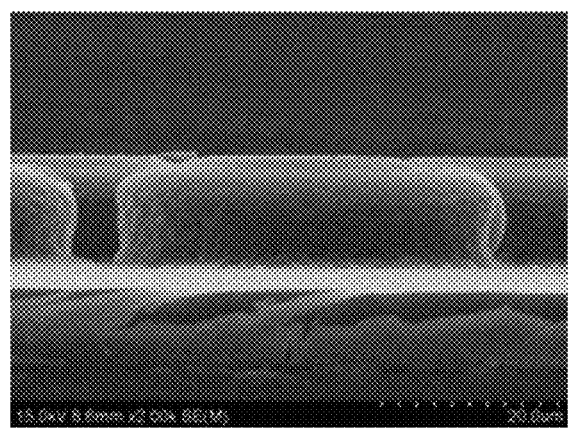

FIGS. 22A-D and 23A-B are scanning electron microscopy (SEM) images of black spacers formed in the above manner, where FIGS. 22A-B illustrate top down and side views for spacers in which the ultraviolet irradiance level is about 4,700 mJ/cm$^2$ upon UV curing (Comparative Example 1) and FIGS. 23A-D illustrate top down and side views for spacers in which the ultraviolet irradiance level is about 18,700 mJ/cm$^2$ (Comparative Example 2).

As confirmed in the drawings, according to the ultraviolet irradiance levels, the inverted-cone (constant tapered shape) spacers were formed in Comparative Example 1 and the columnar (vertical tapered shape) spacers were formed in Comparative Example 2, but in either case, no hemispherical spacer was formed. That is, unless the imprinting mask containing the light-shielding layer according to the present application is applied, a large amount of ultraviolet irradiance level is required for forming spacers, and any hemispherical spacer cannot be obtained even if the ultraviolet irradiance level is controlled. In addition, when the photomasks of Comparative Examples 1 and 2 were applied, the column spacers were distributed in a size (30 μm to 46 μm) larger than the diameter (25 μm) of the exposed region of the applied mask, whereby it can also be seen that spacers with a precisely controlled uniform size distribution cannot be obtained.

Test Example 1. Evaluation of Adhesion

Figure 24A:
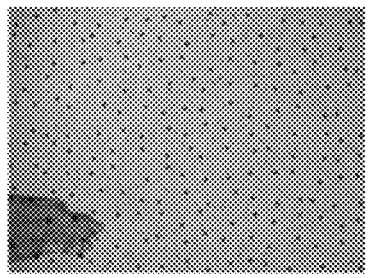
FIGS. 24A-B are photographs showing adhesion test results of Examples or Comparative Examples of the present disclosure.
Figure 24B:
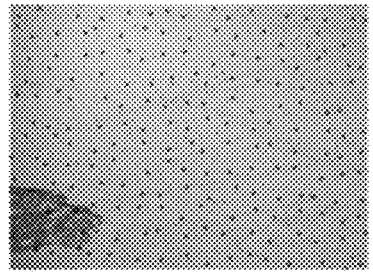
Figure 25A:
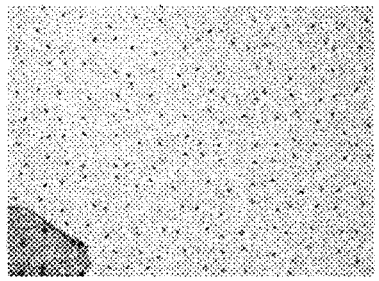
FIGS. 25A-B are photographs showing adhesion test results of Examples or Comparative Examples of the present disclosure.
Figure 25B:
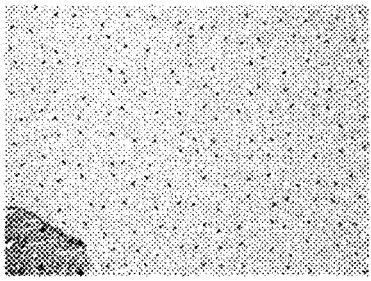
Figure 26A:
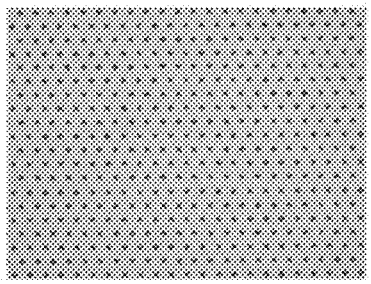
FIGS. 26A-F are photographs showing adhesion test results of Examples or Comparative Examples of the present disclosure.
Figure 26C:
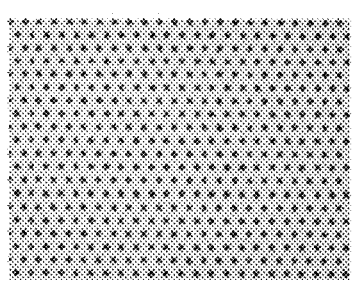
Figure 26E:
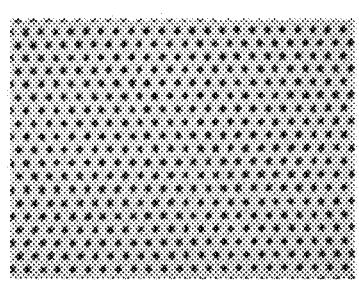
Figure 26B:
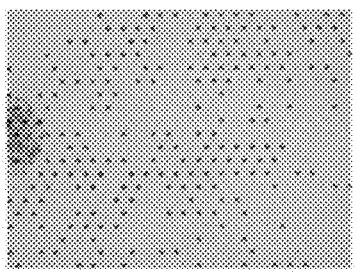
Figure 26D:
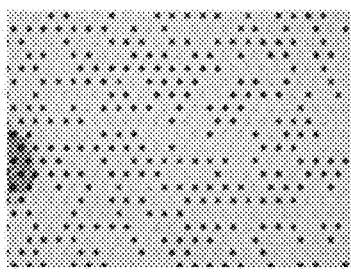
Figure 26F:
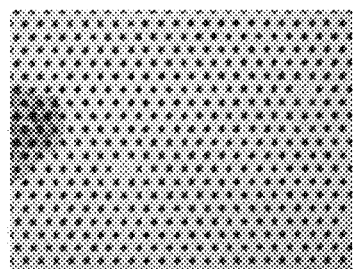

A pressure-sensitive adhesive tape (Nichiban tape, CT-24) (peel force: 3.72 to 4.16N/10 mm, peel angle: 180 degrees, JIS Z 1522 standard) was attached to the surface of the substrate produced in Example or Comparative Example, on which the black column spacers were formed, with a rectangular attachment area of approximately 24 mm in width and approximately 40 mm in length. At the time of the attachment, the pressure-sensitive adhesive tape was attached by applying a load of about 200 g thereon using a roller. Thereafter, the pressure-sensitive adhesive tape was peeled off in the longitudinal direction using a tensile tester at a peel rate of about 30 mm/s and a peel angle of 180 degrees. FIGS. 24A-B are top down views of a substrate before and after peeling, respectively, and indicate whether or not the spacers are lost before and after peeling with respect to Example 1, where the left side (FIG. 24A) is a view before peeling and the right side (FIG. 24B) is a view after peeling. FIG. 25 A-B are top down views of a substrate before and after peeling, respectively, and indicate whether or not the spacers are lost before and after peeling with respect to Example 2, where the left side (FIG. 25A) is a view before peeling and the right side (FIG. 25B) is a view after peeling. In the case of Examples 1 and 2, it can be confirmed from the drawings that the loss of the spacers did not occur in both cases, and as a result of actual confirmation, the loss rate was 0%.

FIGS. 26A-F is results of the above test for Comparative Examples, where the leftmost upper and lower views in the views are for Comparative Example 1, the center upper and lower views are for Comparative Example 2, and the rightmost upper and lower views are for Comparative Example 3.

In the case of Comparative Examples 1 and 2, it can be confirmed from the drawing that a significant level of pattern loss occurs (pattern loss rate of Comparative Example 1: approximately 50%, pattern loss ratio of Comparative Example 2: approximately 30%). In the case of Comparative Examples, a very large amount of ultraviolet irradiance level has been applied relative to Examples, it can be confirmed through this that the adhesion to the ITO layer of the base material has been remarkably lowered.

Test Example 2. Performance Evaluation

A known alignment film was formed on the substrates produced in Examples 1 and 2, a conventional liquid crystal cell capable of controlling the light transmittance was formed using each substrate on which the alignment film was formed, and then a change in transmittance according to the applied voltage was observed. As a result, while both of the substrates produced in Examples 1 and 2 maintained the shape of the hemispherical black spacer inside the liquid crystal cell, they exhibited a change in transmittance with increasing the driving voltage and also suppressed light leakage when displayed in black.

The invention claimed is:
1. A substrate, comprising:
a base layer;
a black column spacer formed on the base layer;
an electrode layer present between the base layer and the black column spacer, wherein the black column spacer is in contact with the electrode layer, wherein the black column spacer has an optical density in a range of 1.1 to 4, wherein the black column spacer has a curved portion and a tapered portion, wherein the tapered portion is disposed between the curved portion and the base layer, wherein the curved portion has a central cross section, where the central cross section extends across the entire width of the curved portion, wherein the central cross section of the curved portion consists of a curved part or consists of the curved part and a portion having curvature of 0, wherein the curved part has a center of curvature inside the central cross section of the curved portion, wherein a cross section of the tapered portion has a curved shape, wherein a center of the curvature of the curved shape is outside a cross section of the black column spacer, and wherein the curved shape of the tapered portion extends to a bottom end of the spacer and contacts the electrode layer.

2. The substrate according to claim 1, wherein the black column spacer comprises a pigment or a dye.

3. The substrate according to claim 1, wherein the black column spacer comprises a metal oxide, a metal nitride, a metal oxynitride, carbon black, graphite, an azo-based pigment, a phthalocyanine pigment or a carbon-based material.

4. The substrate according to claim 1, wherein the base layer is an inorganic base layer or an organic base layer.

5. The substrate according to claim 1, wherein a curvature of the curved part has a maximum of 2,000 mm$^{-1}$ or less.

6. The substrate according to claim 5, wherein the central cross section of the curved portion consists of the curved part.

7. The substrate according to claim 1, wherein the curved portion has a height in a range of 1 μm to 20 μm and a width in a range of 2 μm to 40 μm.

8. The substrate according to claim 1, comprising a plurality of black column spacers, wherein a loss rate of the black column spacers from the substrate is 15% or less, wherein the loss rate is measured by attaching a pressure-sensitive adhesive tape to the surface of the base layer, on which the black column spacers are formed, with a rectangular attachment area of 24 mm in width and 40 mm in length and then peeling the pressure-sensitive adhesive tape in the longitudinal direction at a peel rate of about 30 mm/s and a peel angle of about 180 degrees is 15% or less, wherein the peel force is about 3.72N/10 mm to 4.16N/10 mm when measured at the peel angle of 180 degrees in accordance with JIS Z 1522 standard.

9. The substrate of claim 1, comprising:
a protective pressure-sensitive adhesive film attached to the surface of the base layer and covering the curved portion of the black column spacer.

10. A method for producing a substrate having a base layer and a black column spacer formed thereon, the black column spacer having an optical density in a range of 1.1 to 4, and having a curved portion, wherein a cross section of the curved portion having at least one region having curvature, the method comprising:
pressing an imprinting mask onto a photocurable material disposed on the base layer to shape the photocurable material into the shape of the black column spacer, wherein the imprinting mask has a light-transmissive main body, wherein a molded form of the black column spacer is recessed into a surface of a light-transmissive main body, and a light-shielding layer is formed on the remaining surface of the main body on which the molded form is not present; and
curing a portion of the photocurable material that is present in the molded form of the imprinting mask through the light-transmissive body, wherein a remaining portion of the photocurable material covered by the light-shielding layer is not cured.

11. The method for producing a substrate according to claim 10, comprising:
forming an electrode layer on the base layer; and
then disposing the photocurable material on the electrode layer.

12. An optical device, comprising:
the substrate of claim 1; and
a second substrate disposed opposite to the substrate, wherein a gap is maintained between the substrate and the second substrate by the black column spacer.

13. The optical device according to claim 12, wherein a liquid crystal material is present in the gap.

* * * * *